United States Patent [19]

Nicollini et al.

[11] Patent Number: 5,712,777
[45] Date of Patent: Jan. 27, 1998

[54] VOLTAGE MULTIPLIER WITH LINEARLY STABILIZED OUTPUT VOLTAGE

[75] Inventors: Germano Nicollini, Piacenza; Pierangelo Confalonieri, Canoica D'Adda, both of Italy

[73] Assignee: SGS-Thomson Microelectronics, S.r.l., Italy

[21] Appl. No.: 414,277

[22] Filed: Mar. 31, 1995

[30] Foreign Application Priority Data

Aug. 31, 1994 [EP] European Pat. Off. ............ 94830413

[51] Int. Cl.⁶ ................................................. H02M 3/07
[52] U.S. Cl. ....................................... 363/60; 363/59
[58] Field of Search ........................... 323/314; 327/536; 363/59, 600, 61

[56] References Cited

U.S. PATENT DOCUMENTS

| | | | |
|---|---|---|---|
| 4,636,930 | 1/1987 | Bingham et al. | 363/60 |
| 4,807,104 | 2/1989 | Floyd et al. | 363/39 |
| 5,051,881 | 9/1991 | Herold | 363/60 |
| 5,095,223 | 3/1992 | Thomas | 363/60 |
| 5,111,375 | 5/1992 | Marshall | 363/59 |
| 5,132,895 | 7/1992 | Kase | 363/59 |
| 5,159,543 | 10/1992 | Yamawaki | 363/60 |
| 5,262,934 | 11/1993 | Price | 363/60 |
| 5,306,954 | 4/1994 | Chan et al. | 363/60 |
| 5,463,542 | 10/1995 | Okamoto | 363/60 |
| 5,493,543 | 2/1996 | Kamens | 363/60 |

FOREIGN PATENT DOCUMENTS 0 540 948 A2 12/1993 European Pat. Off. ......... H02M 3/07

*Primary Examiner*—Jeffrey L. Sterrett
*Attorney, Agent, or Firm*—Felsman, Bradley, Gunter & Dillon, LLP

[57] ABSTRACT

A voltage multiplier includes a first charge transfer capacitor designed to take and transfer electrical charges from the input terminal to the output terminal, a second capacitor for charge storage connected between the output terminal and ground and an output voltage stabilization circuit. The output voltage stabilization circuit includes an integrator designed to generate a continuous voltage corresponding to the difference between a reference voltage and the output voltage of the voltage multiplier. The continuous voltage is applied to one terminal of said charge transfer capacitor so that the potential at the other terminal of the capacitor changes proportionally to the output voltage of the voltage multiplier.

19 Claims, 3 Drawing Sheets

5,712,777

VOLTAGE MULTIPLIER WITH LINEARLY STABILIZED OUTPUT VOLTAGE

BACKGROUND OF THE INVENTION

1. Field of the Invention

The present invention relates to a voltage multiplier or booster having an output voltage stabilization circuit operating in a linear manner.

2. Description of the Prior Art

Very often in electronic systems there is the need to generate voltages higher than the power supply voltage, for example, in low-voltage battery-powered devices or in EEPROM memories requiring a writing voltage much higher than the conventional 5V supply. The circuit carrying out this function is called a voltage multiplying or booster circuit and is commonly provided inside the integrated circuit.

An example of a voltage multiplying circuit capable of delivering output currents of considerable size (up to a few tenths of a mA) as in the case of integrated analog circuits for which the power supply voltage must be doubled or tripled for operational reasons is shown in FIG. 1.

This solution calls for the use of at least two rather large capacitors normally outside the integrated circuit. The first capacitor C1 serves to take and transfer electric charges from the input terminal of the multiplier to the output terminal while the second capacitor C2 serves to store these charges.

The four switches (sw1a, sw1b, sw2a, sw2b) are driven by means of a first phase signal Φ1 and a second phase signal Φ2 not temporally overlapped. During a first phase Φ1 the charge transfer capacitor C1 is connected between the power voltage Vbat and a ground and then on the upper plate there develops a voltage equal to Vbat in relation to the lower plate. During the second phase Φ2 the lower plate is replaced at Vbat while the upper plate is connected to the output node on which develops a voltage Vout higher than the voltage Vbat.

If current delivered were null, it is intuitive that after a few clock periods the output voltage Vout would be equal to twice Vbat and perfectly stable. However, with current on the load, the value of the output voltage Vout would be influenced by the voltage drops on the capacitors and on the switches which depend on the current value, on the process used and on the working temperature.

However it is often necessary that the boosted output voltage Vout be kept constant even with changes in the value of the supply voltage Vbat, e.g. in the case of battery-powered systems, because battery voltage can vary greatly during discharge of same. In these cases it is necessary to stabilize output voltage Vout by means of a special regulation circuit.

A known solution in which is implemented an output voltage stabilization circuit of a voltage multiplier is described in European patent application no. 92118084 filed by Motorola Inc. 22 Oct. 1992 and published with no. 0540948 dated 12 May 1993.

The voltage multiplier described in said patent application is the same type described above and the stabilization circuit is provided by means of a negative regulation loop for the output voltage Vout. The regulation loop is achieved by means of an integrator designed to generate a continuous error signal proportional to the difference between the output voltage of the voltage multiplier and a reference voltage.

This error signal is used to drive (in a conduction phase of the operation cycle of the voltage multiplying circuit) a transistor acting as a connection switch of the charge transfer capacitor at the power supply voltage controlling its internal resistance and hence the capacitor charge time constant. In this manner it is managed, with rated operation, to keep constant the value of the output voltage of the voltage multiplying circuit.

The main problem tied to this solution is that the dependency between the internal resistance of an MOS transistor and the voltage applied on its control gate is strongly non-linear and consequently the regulation loop is also non-linear.

As known to those skilled in the art a non-linear feedback loop can exhibit considerable "locking time" problems, i.e. reaching the correct output voltage from the moment when the circuit is started, and problems in holding said output voltage after current peaks due to sudden load absorption.

The technical problem underlying the present invention is to conceive a voltage multiplier or booster for relatively high output currents having structural and functional characteristics allowing output voltage to be stable and virtually independent of the power supply voltage, temperature, the process and, within certain limits, also of the load absorbed current, thereby overcoming the shortcomings indicated above with reference to the prior art.

SUMMARY OF THE INVENTION

A voltage multiplier includes a first charge transfer capacitor designed to take and transfer electrical charges from the input terminal to the output terminal, a second capacitor for charge storage connected between the output terminal and ground and an output voltage stabilization circuit.

The output voltage stabilization circuit includes an integrator designed to generate a continuous voltage corresponding to the difference between a reference voltage and the output voltage of the voltage multiplier.

According to the present invention the continuous voltage is applied to one terminal of said charge transfer capacitor so that the potential at the other terminal of the capacitor changes proportionally to the output voltage of the voltage multiplier.

The characteristics and advantages of the circuit in accordance with the present invention are set forth in the description of an embodiment thereof given below by way of non-limiting example with reference to the annexed drawings.

DETAILED DESCRIPTION OF THE PREFERRED EMBODIMENTS

Figure 1:
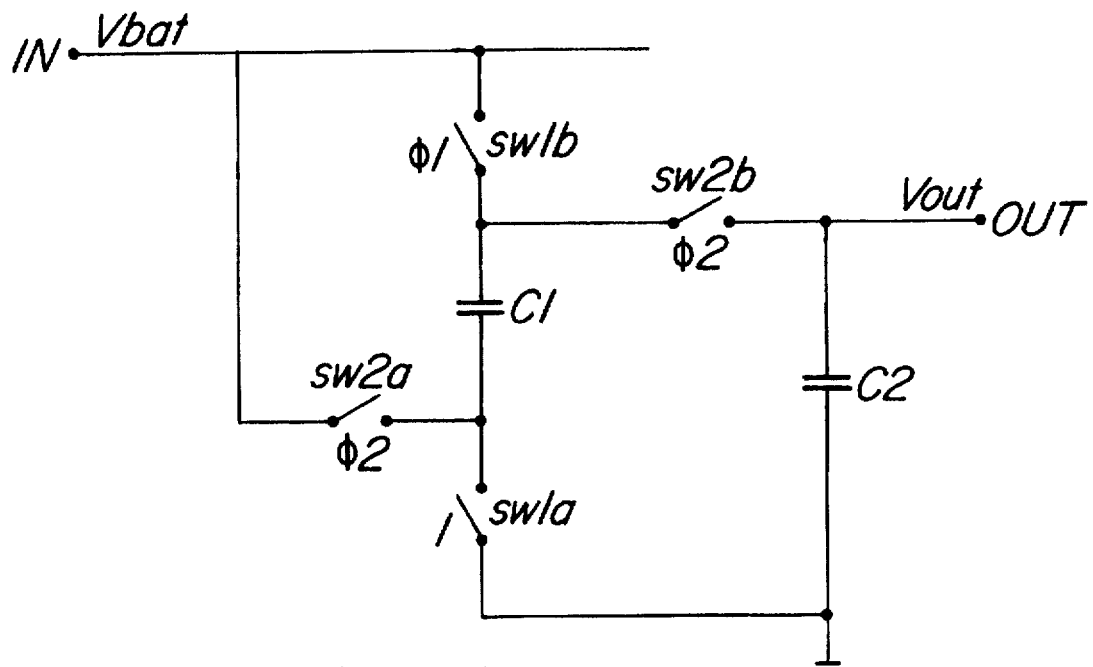
FIG. 1 shows a functional diagram of a voltage multiplying circuit designed to deliver a relatively high current.
Figure 2:
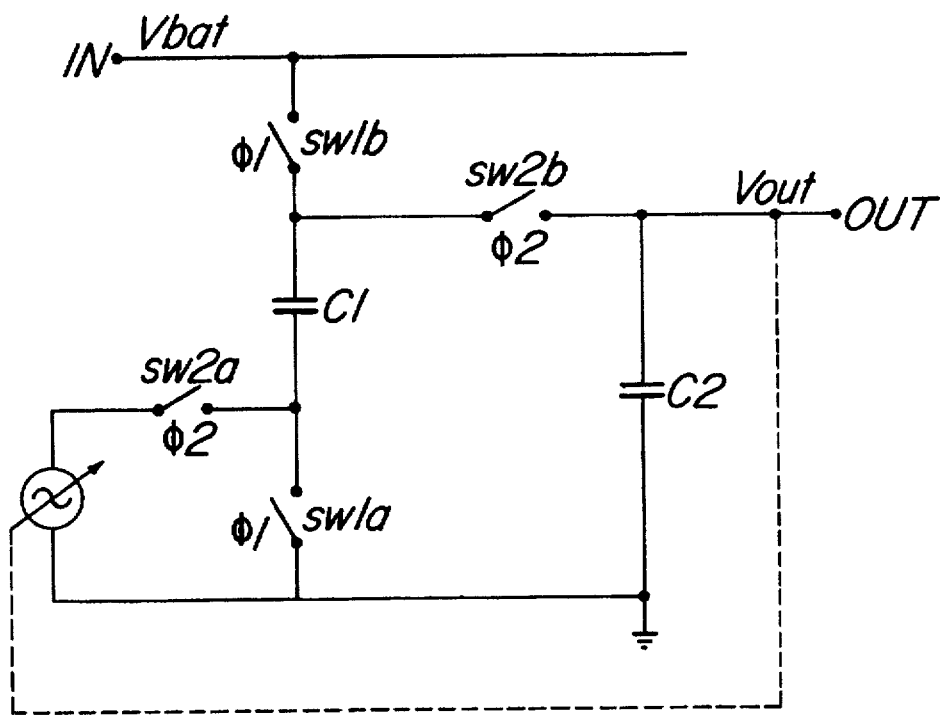
FIG. 2 shows a functional diagram of a first voltage multiplier equipped with an output voltage stabilization circuit in accordance with the present invention.

In FIG. 2 the lower plate of the capacitor C1 is connected during the phase Φ2 of the control clock cycle to a variable voltage generator depending linearly on the value of the voltage Vout present on the output node OUT of the voltage multiplier.

Figure 3:
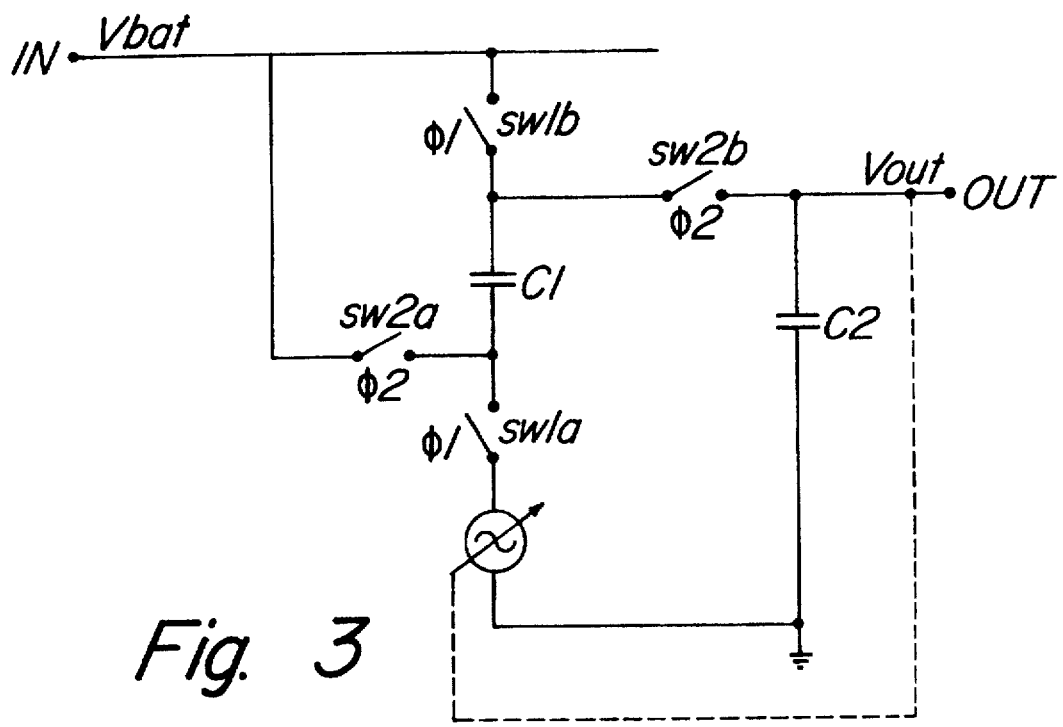
FIG. 3 shows a functional diagram of a second voltage multiplier equipped with an output voltage stabilization circuit in accordance with the present invention.

An analogous solution from the functional viewpoint is shown in FIG. 3 where the lower plate of the capacitor C1 is connected during the phase Φ1 of the control clock cycle to a variable voltage generator depending linearly on the value of the voltage Vout present on the output node OUT of the voltage multiplier.

Figure 4:
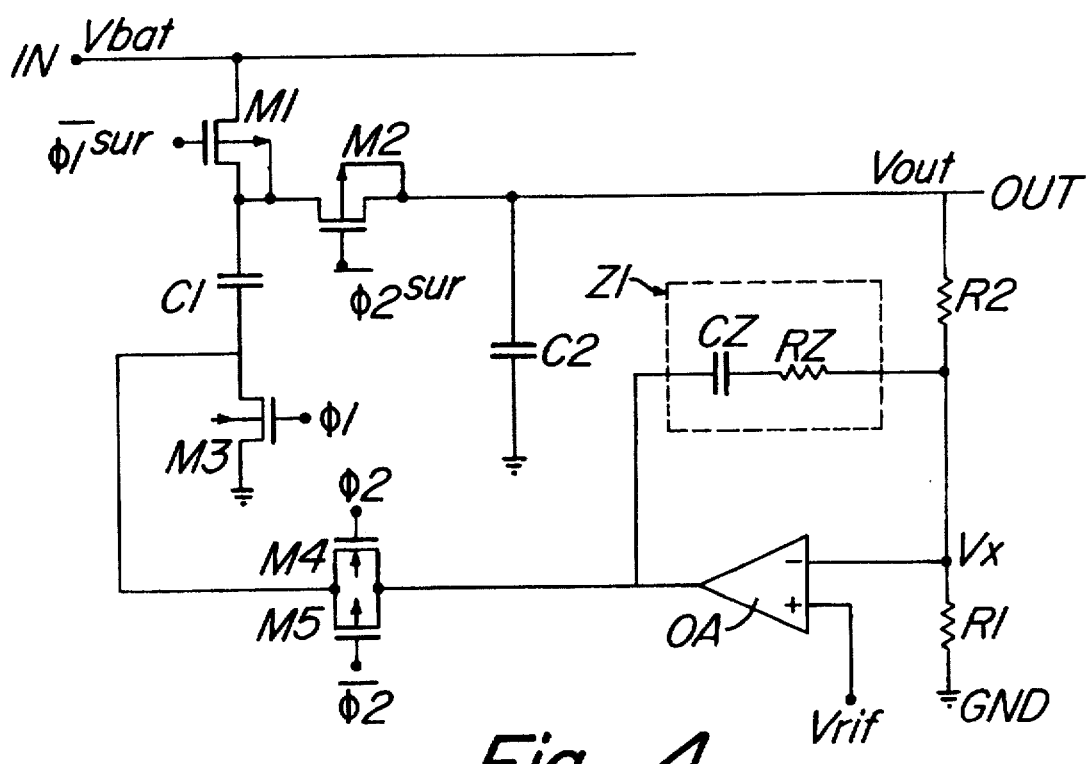
FIG. 4 shows an electrical diagram of a first embodiment of the voltage multiplying circuit shown in FIG. 2 in accordance with the present invention.

With reference to FIG. 4 showing a first embodiment of the functional circuit of FIG. 2 the stabilization feedback loop of the present invention is structured as follows. A voltage divider consists of the two resistances R1 and R2 connected in series between the output node OUT of the voltage multiplying circuit and ground. The voltage divider supplies an attenuated replica Vx of the output voltage Vout of the multiplying circuit at the inverting input of an operational amplifier OA. The operational amplifier OA is powered by voltage Vbat and could not otherwise support an input voltage higher than Vbat.

The operational amplifier OA together with the capacitive feedback network RZ-CZ constitutes the integrator stage. The integrator compares the replica voltage Vx supplied by the divider R1-R2 with a reference voltage Vrif and generates at its output an error signal voltage proportional to the integral of the error between the reference voltage Vrif and the voltage Vx=Vout* (R1/(R1+R2)).

A transfer switch or gate which, in the example shown consists of the pair of MOS transistors M4 and M5 is controlled by the phase signal Φ2 and by its complementary signal and transfers during the phase Φ2 of the control clock cycle the error signal produced by the integrator stage directly on the lower plate of the charge transfer capacitor C1.

The high gain value DC of the feedback loop forces the output voltage Vout to reach the desired value, i.e. Vout= Vrif((R1+R2)/R1). The resistance RZ in series with the integration capacitor CZ of the feedback line of the operational amplifier OA has an important function for the purpose of assuring great stability to the system.

Indeed, in the stabilization loop there are two low-frequency poles which tend to severely reduce the margin of stability of the circuit. The introduction of a resistance RZ in series with CZ causes the creation of a low-frequency zero which compensates for a pole and hence improves the stability of the system.

Figure 5:
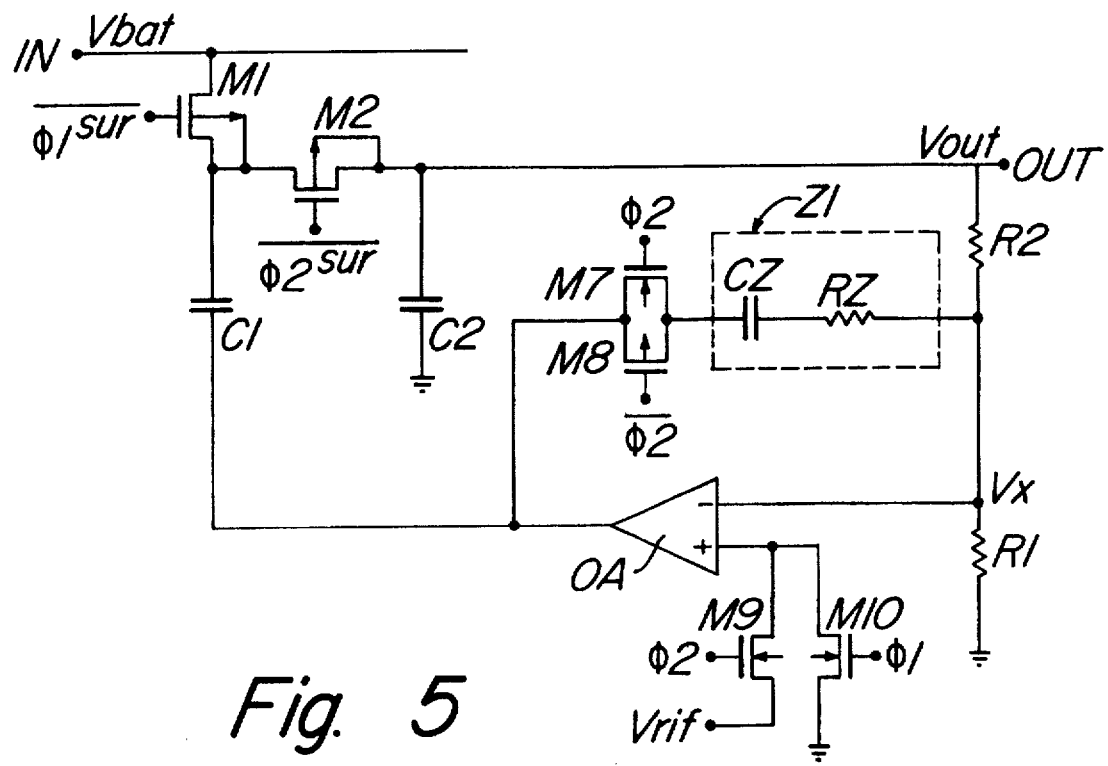
FIG. 5 shows an electrical diagram of a second embodiment of the voltage multiplying circuit shown in FIG. 2 in accordance with the present invention.

A second circuitry solution derived from the circuit of FIG. 4 and shown in FIG. 5 permits decreasing the area occupied by the switching transistors. This solution is particularly suitable when the current absorbed by the load is high (>10 mA).

In this circuit the output of the integrator is connected directly to the lower plate of the charge transfer capacitor C1. The integrator comprises an operational amplifier OA whose inverting input is connected to the central node of the voltage divider R1-R2 and through the series of the resistance RZ, the integration capacitor CZ and a transfer switch or gate M7-M8 to the output of the amplifier.

The non-inverting input is connected through a switch M9 to a reference voltage Vrif and by means of another switch M10 to a ground potential. The MOS transistors M7 and M8 are driven by the phase signal Φ2 and by its complementary signal, the transistor M9 is driven by the phase signal Φ2 and the transistor M10 is driven by the phase signal Φ1.

During the Φ1 phase the lower plate of the charge transfer capacitor C1 is forced to the ground potential of the operational amplifier OA since its feedback loop is open and its non-inverting input is connected to ground. The upper plate of the charge transfer capacitor C1 is connected to the power voltage Vbat. In this manner the charge transfer capacitor C1 is charged at the power voltage Vbat.

During the phase Φ2 the non-inverting input of the operational amplifier OA is brought to the reference voltage Vrif by means of closing of the transistor M9 and simultaneously the feedback loop of the operational amplifier OA is closed. In this manner the output voltage of the operational amplifier OA reaches a value proportional to the integral of the error between the reference voltage Vrif and the output voltage Vout*(R1/(R1+R2)). The lower plate of the charge transfer capacitor C1 is thus at a voltage such as to take the output voltage to the desired value Vout=Vrif*((R1+R2)/R1).

Figure 6:
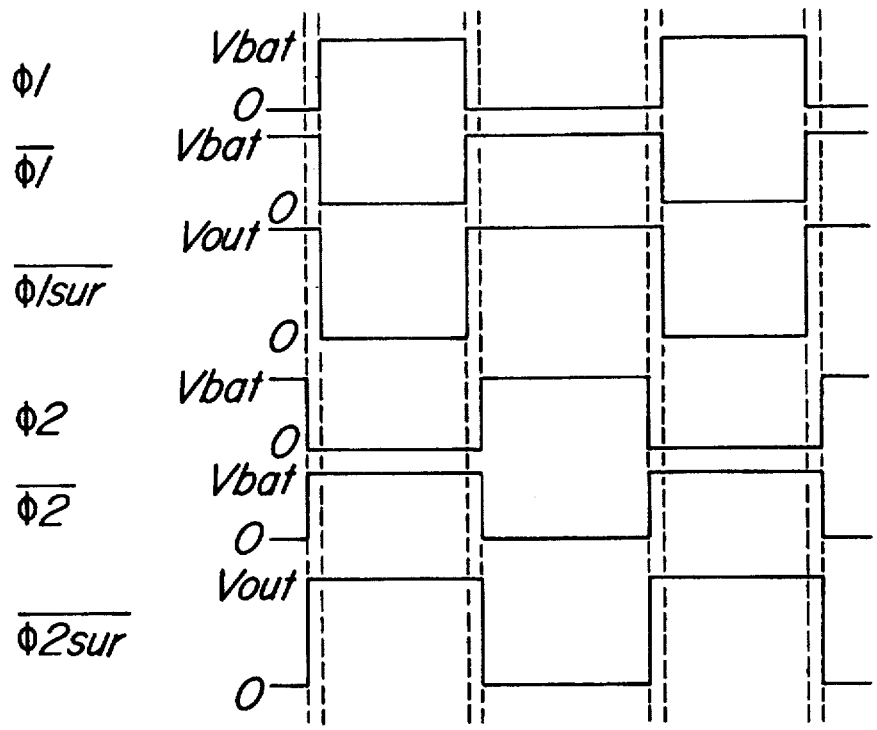
FIG. 6 shows the waveform of the driving phases employed in the circuit of the present invention.

FIG. 6 shows the timing diagrams of the control phases employed in the circuits of FIGS. 4 and 5 in accordance with two embodiments of the circuit of the present invention. As may be seen, the phase $\overline{\Phi 1}$ is virtually coincident with the phase $\overline{\Phi 1 sur}$ while the phase $\overline{\Phi 2}$ is essentially coincident with the phase $\overline{\Phi 2 sur}$. The phases $\overline{\Phi 1 sur}$ and $\overline{\Phi 2 sur}$ are commonly generated by a timing circuit powered with the output voltage Vout. In other words, the driving phases $\overline{\Phi 1 sur}$ and $\overline{\Phi 2 sur}$ are voltage boosted phases.

In conclusion the circuit in accordance with the present invention allows provision of a voltage multiplier or booster for relatively high output currents whose output voltage is stable and virtually independent of the power supply voltage, temperature and, within certain limits, the current absorbed by the load.

Furthermore, the control loop of the output voltage of the multiplier being linear, the initial settling time upon starting of the circuit is very short, i.e. on the order of 500 microseconds as compared with the tens of milliseconds typical of the circuits of the known art.

I claim:

1. An output voltage stabilization circuit for a voltage multiplier having an input terminal, an output terminal, a charge transfer capacitor designed to take and transfer electrical charges from the input terminal to the output terminal, said stabilization circuit comprising:

an integrator having a first input coupled with the output terminal of the multiplier, a second input for receiving a reference voltage and an output for generating a continuous voltage corresponding to the difference between the reference voltage and the output voltage of the voltage multiplier;

wherein said continuous voltage is applied to one terminal of said charge transfer capacitor.

2. The circuit of claim 1, wherein the continuous voltage is applied to said terminal of the charge transfer capacitor by means of a switch interlocked with at least one timing signal.

3. The circuit of claim 2, wherein said switch comprises a pair of functionally complementary transistors connected in parallel together and driven by first and second timing signals complementary with each other.

4. The circuit of claim 3, wherein said first timing signal is a signal coinciding with a driving phase of a switch for transfer of the charge stored in said charge transfer capacitor to an output capacitor of the voltage multiplier.

5. The circuit of claim 4, wherein said driving phase is a voltage boosted phase while said first and second timing signals are not voltage boosted signals.

6. The circuit of claim 1, wherein said integrator is provided with an operational amplifier having a negative feedback line comprising an impedance connected in series between an inverting input and the output of the amplifier and the output of the integrator is coupled with said terminal of said charge transfer capacitor.

7. The circuit of claim 6, wherein said impedance comprises an integration capacitor and a resistance and the value of said resistance is such as to provide a low-frequency zero in the transfer function of the operational amplifier to improve stability.

8. A voltage multiplier comprising:
   at least one first charge transfer capacitor and a second capacitor for charge storage;
   a first switch connecting to a first reference voltage a first terminal of said first charge transfer capacitor;
   a second switch connecting to a second reference voltage a second terminal of said first charge transfer capacitor;
   a third switch connecting to a first terminal of said second capacitor constituting an output node of the multiplier said second terminal of said first charge transfer capacitor;
   the first and second switches being controlled by a first driving phase signal and said third switch being controlled by a second driving phase signal;
   an operational amplifier having a non-inverting input to which is applied a third reference voltage, an inverting input connected to said output node by means of a voltage divider and to the output of the amplifier by means of an impedance; and
   a fourth switch connected between the output of the operational amplifier and said first terminal of the first charge transfer capacitor.

9. The voltage multiplier of claim 8, wherein said fourth switch comprises a transfer gate controlled by a first control signal and by its complementary signal coinciding with said second driving phase signal.

10. The voltage multiplier of claim 8, wherein said impedance comprises an integration capacitor and a resistance and the value of said resistance being such as to provide a low-frequency zero in the transfer function of the operational amplifier to improve stability.

11. A voltage multiplier comprising:
    at least a first charge transfer capacitor and a second capacitor for charge storage;
    a first switch designed to connect to a first reference voltage a first terminal of said first charge transfer capacitor;
    a second switch designed to connect to a first terminal of said second capacitor constituting an output node of the multiplier the first terminal of said first charge transfer capacitor;
    said first switch being controlled by a first driving phase signal and said second switch being controlled by a second driving phase signal;
    an operational amplifier having a non-inverting input connected by means of a third switch controlled by a first timing signal coinciding and in phase with said second driving phase signal to a second reference voltage and by means of a fourth switch controlled by a second timing signal coinciding and in phase with said first driving phase signal to a third reference voltage, an inverting input connected to said output node by means of a voltage divider and to the output of the operational amplifier by means an impedance and a fifth switch in series.

12. The voltage multiplier of claim 11, wherein said fifth switch comprises a transfer gate controlled by a first control signal and by its complementary signal and coinciding with said second driving phase signal.

13. The voltage multiplier of claim 11, wherein said impedance comprises an integration capacitor and a resistance with the value of said resistance being such as to provide a low-frequency zero in the transfer function of the operational amplifier to improve stability.

14. Method for multiplying voltage comprising the steps of:
    alternately coupling a first terminal of a charging capacitor to a first supply voltage terminal or to a second supply voltage terminal, respectively in response to first and second control signals;
    sensing the output voltage;
    generating an error signal proportional to a difference between the output voltage and a reference voltage; and
    controlling the amplitude of the second supply voltage in response to the error signal to maintain the output voltage at a constant level.

15. The method of claim 14, wherein the error signal is generated by integrating the difference between said output voltage and said reference voltage.

16. The method of claim 14, wherein the error signal is generated integrating the difference between a reduced replica of said output voltage and said reference voltage.

17. Voltage multiplier comprising:
    a charge pump circuit including a charging capacitor having a first terminal connected to an alternating voltage which varies periodically from a first voltage level to a second voltage level, respectively in response to a first and a second control signals;
    a sensing circuit connected to an output of the charge pump circuit; and
    a control circuit, connected to an output of the sensing circuit, for varying the amplitude of the second voltage level to maintain the output voltage of the voltage multiplier at a constant level.

18. The multiplier of claim 17, wherein the control circuit comprises an integrating stage generating an error signal proportional to a difference between said output voltage and a reference voltage, said error signal varying the amplitude of the second voltage level.

19. The multiplier of claim 17, wherein the control circuit comprises an integrating stage generating an error signal proportional to a difference between a reduced replica of said output voltage and a reference voltage, said error signal varying the amplitude of the second voltage level.

* * * * *